Feb. 8, 1966 C. PASSAGGIO 3,233,523
FLUID CYLINDER AND VALVE CONTROL MEANS THEREFOR
Filed Oct. 17, 1962 3 Sheets-Sheet 1
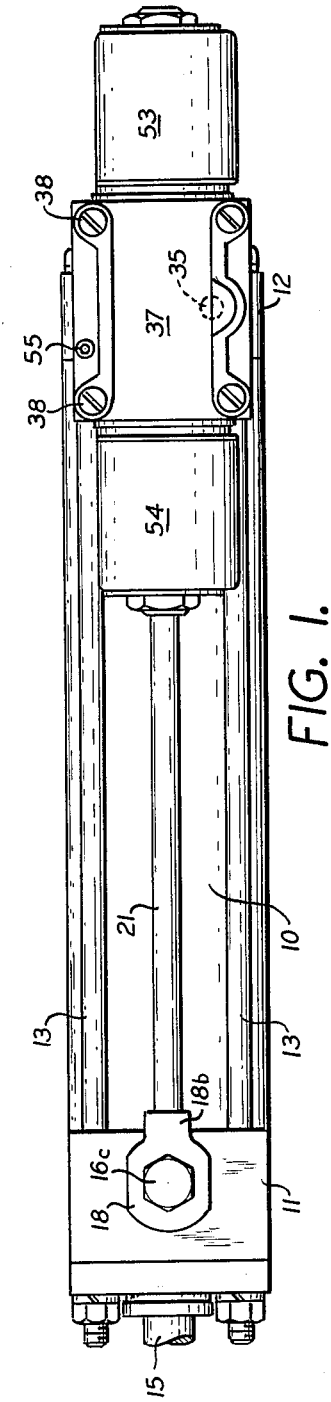
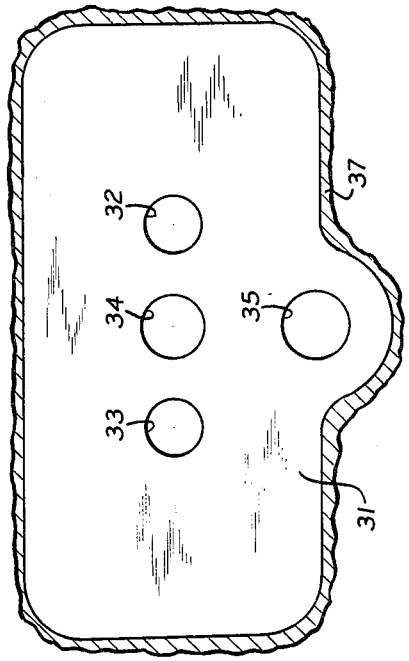
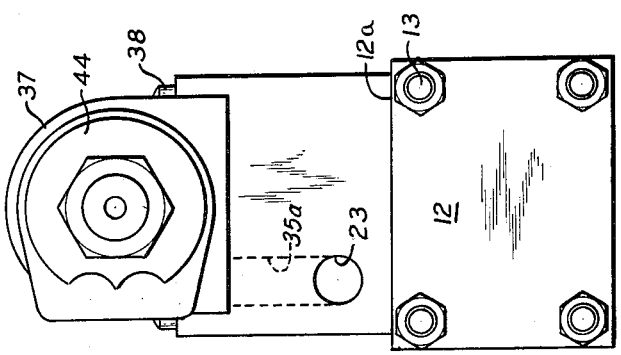
INVENTOR
CHARLES PASSAGGIO
BY
Byerly, Townsend, Watson & Churchill
ATTORNEYS.

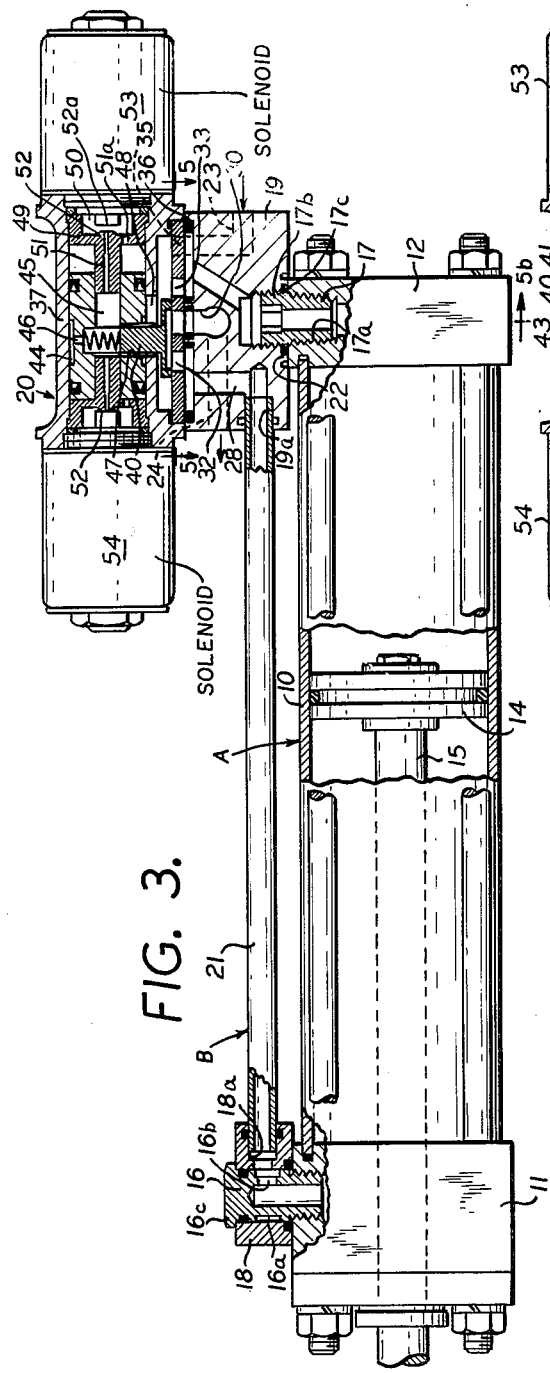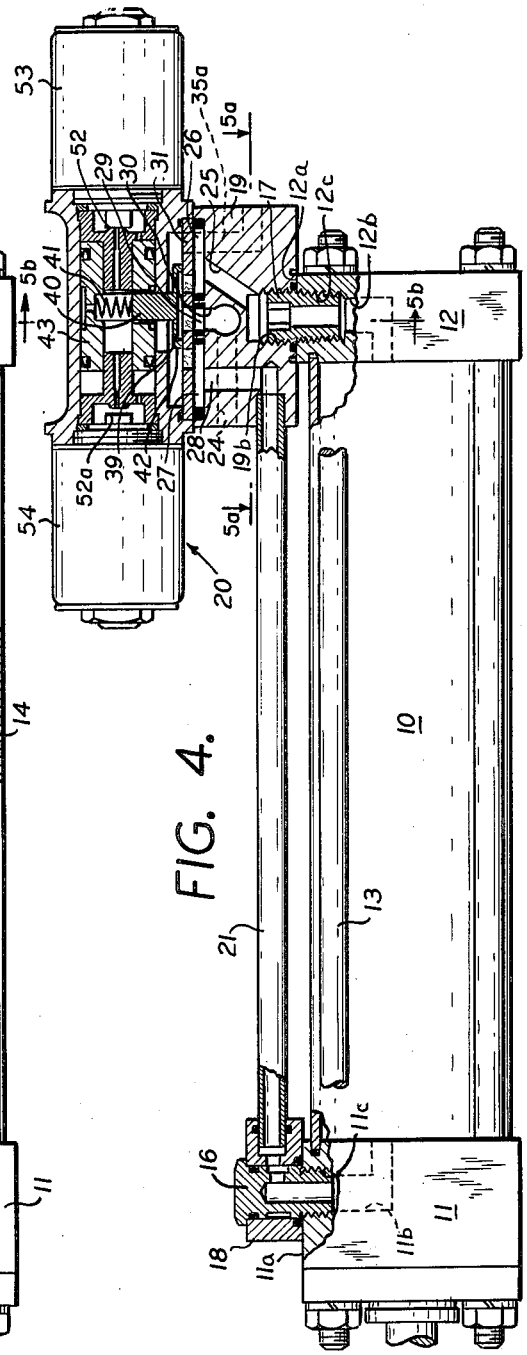

Feb. 8, 1966  C. PASSAGGIO  3,233,523
FLUID CYLINDER AND VALVE CONTROL MEANS THEREFOR
Filed Oct. 17, 1962  3 Sheets-Sheet 3

INVENTOR
CHARLES PASSAGGIO
BY
*Byerly, Townsend, Watson & Churchill*
ATTORNEYS.

3,233,523
FLUID CYLINDER AND VALVE CONTROL MEANS THEREFOR
Charles Passaggio, Dumont, N.J., assignor to Scovill Manufacturing Company, Waterbury, Conn., a corporation of Connecticut
Filed Oct. 17, 1962, Ser. No. 231,213
2 Claims. (Cl. 91—54)

The invention relates to an assembly of a fluid cylinder having therein a double acting piston and a valve control means therefor and aims to provide certain improvements therein. More particularly, the invention constitutes an improvement upon such assembly where the cylinder is of conventional construction and has in each head thereof a port leading from the interior of the cylinder for connection with fluid conducting means and with the valve control means disposed or mounted at a place remote from the cylinder for operation by manually, mechanically or electrically controlled means.

An object of the present invention is to provide valve control means adapted to be mounted directly onto the cylinder and thereby eliminate piping connections between such valve control means to the cylinder.

A further object of the invention is to provide valve control means which can be used as original equipment or as a replacement and substitute for valve control means heretofore remotely connected by piping to a cylinder.

A still further object of the invention is to provide such valve control means which can be mounted readily on standard cylinders of the character set forth without recourse to modifying the constructions of such cylinders.

A still further object of the invention is to enable such valve control means to be so mounted on a cylinder as to provide an assembly of the cylinder and control means best suited to the location and type of cylinder in relation to its operational functioning.

The foregoing and other objects of the invention, not specifically enumerated, are accomplished by providing a control unit adapted to be mounted on the cylinder heads for operation of the piston. Preferably, said control unit comprises a 4-way valve having an inlet port, an exhaust port, and third and fourth ports for connection respectively with the ports in the cylinder heads, a coupling member connecting the third port with the port in one of the cylinder heads and serving to mount said unit directly on said cylinder head and fluid coupling means connecting the fourth port to the port in the other cylinder head, the 4-way valve having a slide valve element for selectively establishing fluid communication between the inlet port and either the third or fourth ports respectively, while establishing fluid communication between the exhaust port and either the fourth or third ports respectively.

The invention will be better understood from the detailed description which follows when considered in connection with the accompanying drawings showing a preferred embodiment wherein:

FIG. 1 is a top plan view of an assembly embodying the invention.

FIG. 2 is a right end view of FIG. 1.

FIG. 3 is a front elevation of the assembly, parts being broken away to better show details of construction of the control unit, the slide valve of which is shown in one operative position.

FIG. 4 is a view similar to FIG. 3 showing the slide valve in another operative position.

FIG. 5 is a section taken along the line 5—5 of FIG. 3.

Figure 5A:
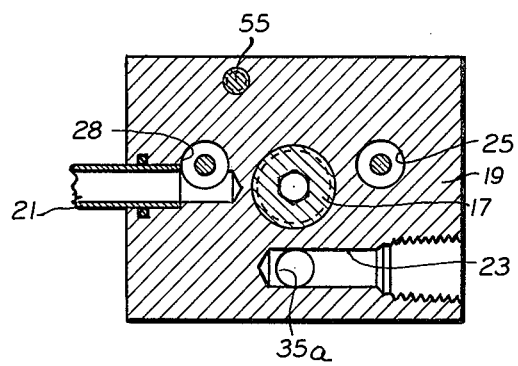
FIG. 5A is a section taken along the line 5a—5a of FIG. 4.
Figure 5B:
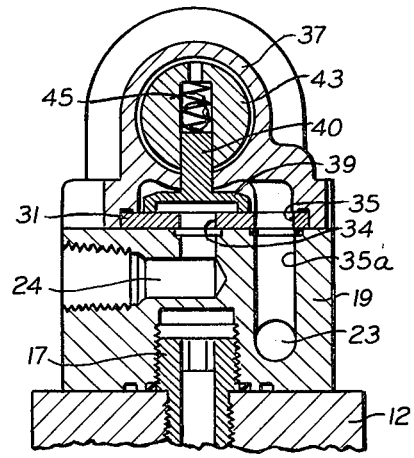
FIG. 5B is a section taken along the line 5b—5b of FIG. 4.

Referring to the drawings, the invention may be said to consist of an air cylinder A for delivering a push, a pull, or a push and a pull, through an air powered stroke of a piston in said cylinder and a control unit B adapted to be mounted directly onto said air cylinder A for controlling the functioning thereof.

The air cylinder A may be and is preferably of conventional design and consists of a hollow cylindrical body 10 to the opposite ends of which are fixedly mounted heads 11 and 12 by tie rods 13. Within the cylindrical body 10 is slidably mounted a piston 14 carried by a piston rod 15 which extends through the head 11 for operative engagement with an operating member (not shown). The heads 11 and 12 each has at least one flat side wall 11a and 12a, respectively, from which extends a duct or port, 11b and 12b, respectively, to the interior of the cylindrical body 10, which ports connect with an inlet or an exhaust, depending upon which face of the piston is being operated upon by the air pressure; said ports are internally screw threaded at their outer end as shown at 11c and 12c to accommodate, respectively, a screw threaded hollow stud 16 and a hollow screw threaded adapter 17, which stud and adapter may be hereinafter referred to as coupling members.

The control unit B consists of a base member or connector 18, a valve base block 19, a valve assembly 20 mounted on the base block 19 and a connector tube 21. The connector 18 and the valve base block 19 each has a flat bottom face for seating on a flat side of the cylinder heads and for securement to said heads by the stud 16 and the adapter 17, respectively. The connector 18 has an annular wall with a projecting lug 18b through which lug and annular wall extends a port socket 18a and the valve base block has a port socket 19a and said sockets when disposed in confronting aligned relation are adapted to accommodate the opposite ends of the connector tube 21. Suitable O-ring packings are mounted in the sockets 18a and 19a to provide leak-tight seals between said sockets and the connector tube 21.

The screw threaded hollow stud 16 has an enlarged shank in which is formed a peripheral groove 16a and a radial hole 16b to provide open communication between the interior of the stud and the peripheral groove. The stud 16 also has a head 16c of larger diameter than the shank, which head serves to lock the connector 18 to a cylinder head. Suitable O-ring packings are mounted between the connector 18 and the stud 16 and the flat side on the cylinder head to provide leak-tight swivel seals between said connector and said other parts.

The hollow adapter 17 at each end is externally screw threaded as shown at 17a and 17b and between said threads has an enlarged external flange 17c. The threads 17a are adapted for engagement with the threaded end 12c of the port 12 and the threads 17b for engagement with an internal threaded port socket 19b leading from the flat face of the valve base block 19 for attachment of said block to a cylinder head. To insure a leak-tight seal between the flat face of the base block 19 and the flat side of a cylinder head, an O-ring packing 22 may be disposed between said parts.

The base block 19 in addition to the aforementioned port sockets 19a and 19b therein is formed with an inlet port 23, an exhaust port 24, a port 25 leading from the socket 19b to a top circular port socket 26, a top circular port socket 27 to which leads a port 28 from the port socket 19a and with a port socket 29 to which leads a port 30 from the exhaust port 24. Each of the port sockets 26, 27 and 29 is fitted with an O-ring packing to provide a seal with an overlying valve plate 31 which has ports 32, 33 and 34 therein communicating respectively with said sockets 26, 27 and 29. The ports 32 and 33 may be hereinafter referred to as the fourth port and third port, respectively. The valve plate 31 also has a port 35 in open communication with the inlet port 23 through the passage 35a. The valve plate 31 is held against the O-rings in the sockets 26, 27 and 29 by being mounted within a rabbeted edge in a socket 36 in the flat bottom surface of a valve housing 37 by screws 38 engaging in the top of the base block 19, which screws also serve to hold the housing 37 onto the base block.

Mounted for sliding engagement on the top face of the valve plate 31 is a slide valve 39 having an axial stem 40 which is biased by a spring 41 and an annual slide seal having a socket enclosed by a peripheral rim 42 of a diameter such as to overlie the port 34 and one of the ports 32 or 33. The slide valve 39 is carried by a spool piston 43 which is adapted for axial movement in the valve housing 37, manually, mechanically or electrically, to either of the limiting positions shown in FIGS. 3 and 4. In the present disclosure, operation of the slide valve is to be carried out by electrical means. As shown in the drawings, the spool piston has a peripheral groove 44 open to the interior of the housing 37, an axial bore 45, a port 46 which establishes fluid communication between said groove and said bore through a diametrical socket 47 which houses the spring 41 and also provides fluid clearance with a slot 48 in the outer wall of housing 37. Fixed in each end of the housing 37 is a seat member 49 having a pilot socket 50 and an axial bored stem 51 engaged in the axial bore 45. The outer end of each bored stem 51 is formed with a valve seat 52 for cooperation with the plunger end 52a of a solenoid 53 and 54, respectively. The solenoids are of a commercial type known as No. 32003-110 available from Allied Control Co., Inc., Valve Division, New York, New York and detailed description thereof is here not deemed necessary.

When the solenoid 53 is energized, the slide valve 39 is moved to the left as shown in FIG. 3 by air under pressure and when solenoid 54 is energized, the valve is moved to the right as shown in FIG. 4. More specifically expressed, when the solenoid 53 is energized, the plunger 52a thereof will be drawn inwardly to uncover the valve seat 52 of the right hand seat member, whereupon air under pressure will flow through inlet 23, and duct 35a, pass through the port 35 in the valve plate 31, into the space around the slide seal 39 and its stem 40 into the space in the housing 37 through the peripheral groove 44, port 46, bore 47, axial bored stem 51, into socket 50 and then through a port 51a to move the spool piston and with it the slide valve 39 to the left to uncover port 33, then through said port, socket 26, port 25, socket 19b and adapter 17 into the right end of the cylinder to move the piston 14 to the left. During this action, the air trapped in the socket 50 at the left side of the spool piston 43 will pass through the port 51a in the seat member at the left-hand side of the valve housing 37 and out through the solenoid 54, the air in the cylinder A at the left side of the piston 14 will flow through the hollow stud 16, port 16b therein through the connector tube 21, port 28 into socket 27 and port 32 into the valve seal 39 then through ports 34 and 30 and socket 29 into exhaust port 24. When the solenoid 54 is energized, the plunger thereof will be drawn inwardly to uncover the valve seat 52 of the left hand seat member, whereupon the compressed air will flow through the inlet 23, pass through the port 35 into the space in the housing 37 to move the spool piston to the right in the manner above described to uncover port 32, then pass through socket 27, port 28, socket 19a, connector tube 21 and hollow stud 16 into the cylinder at the left end to act upon the left side of the piston, whereupon the air in the cylinder on the right side of the piston will pass through the adapter 17, port 25, socket 26, port 33 into the valve seal 39 and through the port 34 and port 30 to exhaust port 24.

In assembling the valve control unit on a cylinder, the screw threaded end 17a of the adapter is first threaded into the desired threaded port in one head of the cylinder A and the valve base block 19 of the valve assembly 20 is then threaded over the opposite end of the adapter into engagement with said cylinder head and with the socket 19a in said base block directed toward the opposite end of the cylinder. One end of the connector tube 21 is then inserted into the socket 19a and the other end into the socket 18a of the connector 18. The connector 18 is then positioned over the port in the other cylinder head and the stud 16 screwed home into said port. The O-rings on the respective connected parts will insure leak-tight connections therebetween. To secure the stability and alignment of the assembly when made, a set screw 55, extending through a hole in the valve base block is tightened against the flat face of the cylinder head upon which the valve base is seated. The screw threaded ports in the conventional cylinder heads are the same, hence either may accommodate the stud 16 of the connector 18 or the adapter 17, wherefore the stud 16 and the adapter 17 may be interchanged so that the valve control means may be mounted at either end of a cylinder and thereby provide an assembly of the cylinder and the control unit best suited to the location and type of cylinder in relation to its operational functioning.

While there has been shown a preferred embodiment of the invention, it is to be understood that changes in details of construction and operational arrangement of parts may be resorted to within the range of mechanical and engineering skill without departing from the spirit of the invention as hereinafter claimed.

What I claim is:

1. In combination with a fluid cylinder having a double-acting reciprocatory piston therein and a head attached to and closing each end of the cylinder and each head having a threaded port therein leading to the interior of the cylinder, of a control unit mounted on said cylinder heads for operation of the piston, said control unit comprising at one end a threaded coupling means having a duct therethrough communicating with the threaded port in one head of the cylinder and having at its other end a valve base block seating on the other cylinder head and having a duct therein leading to a blind threaded socket communicating with the threaded port in the other head of the cylinder, a 4-way valve mounted on the base block and having a single inlet port, a single exhaust port and a third and a fourth port communicating respectively with the aforementioned ports in the base block and in the coupling means, an externally double-threaded tubular adapter engaging partially in the port in the cylinder head and partially in the blind threaded socket in the base block, which socket communicates with the duct leading to the third port in the base block, a tube providing communication between the threaded coupling means and the fourth port in the base block, the said adapter and coupling means serving to mount the control unit onto said cylinder heads, the 4-way valve having a movable valve element for selectively establishing fluid communication between the inlet port and either the third or fourth ports, respectively, while establishing fluid communication between the exhaust port and either the fourth and third ports, respectively.

2. The combination according to claim 1, wherein the adapter has a shoulder intermediate its ends engaging the cylinder head supporting the base block and locking means holding the base block in desired relation to the cylinder head to which the base block is connected by the adapter.

References Cited by the Examiner

UNITED STATES PATENTS

| | | | |
|---|---|---|---|
| 2,637,304 | 5/1953 | Dinkelkamp | 91—337 |
| 2,740,384 | 4/1956 | Dinkelkamp et al. | 91—341 |
| 2,745,387 | 5/1956 | Dinkelkamp | 91—342 |
| 2,946,321 | 7/1960 | Lieser | 137—625.66 |
| 2,953,118 | 9/1960 | Flick et al. | 92—164 |
| 2,960,971 | 11/1960 | Tear | 91—342 |
| 2,976,844 | 3/1961 | Goldring | 92—59 |
| 2,976,852 | 3/1961 | Goldring | 91—459 |
| 3,002,532 | 10/1961 | Carlson | 137—625.66 |
| 3,021,823 | 2/1962 | Dinkelkamp | 91—342 |

SAMUEL LEVINE, *Primary Examiner.*

FRED E. ENGELTHALER, *Examiner.*

P. E. MASLOUSKY, J. LABOWSKI,
*Assistant Examiners.*